US008046578B1

(12) United States Patent
Trudeau et al.

(10) Patent No.: US 8,046,578 B1
(45) Date of Patent: Oct. 25, 2011

(54) SYSTEM AND METHOD FOR PROVIDING HTML AUTHENTICATION USING AN ACCESS CONTROLLER

(75) Inventors: Pierre Trudeau, Lorraine (CA); Gilbert Moineau, Montréal (CA)

(73) Assignee: Hewlett-Packard Development Comopany, L.P., Houston, TX (US)

( * ) Notice: Subject to any disclaimer, the term of this patent is extended or adjusted under 35 U.S.C. 154(b) by 1133 days.

(21) Appl. No.: 11/105,652

(22) Filed: Apr. 14, 2005

Related U.S. Application Data (60) Provisional application No. 60/562,397, filed on Apr. 14, 2004.

(51) Int. Cl.
 *H04L 29/06* (2006.01)
(52) U.S. Cl. .............. 713/154; 713/162; 726/7; 726/29
(58) Field of Classification Search .............. 726/7, 17, 726/19, 21, 28, 29, 30; 713/183, 154, 162
See application file for complete search history.

(56) References Cited

U.S. PATENT DOCUMENTS

| | | | | |
|---|---|---|---|---|
| 5,875,296 A * | 2/1999 | Shi et al. | ............................. | 726/5 |
| 5,987,606 A * | 11/1999 | Cirasole et al. | ................. | 726/11 |
| 6,023,724 A * | 2/2000 | Bhatia et al. | ................... | 709/218 |
| 6,102,965 A * | 8/2000 | Dye et al. | ....................... | 717/109 |
| 6,154,776 A * | 11/2000 | Martin | ........................... | 709/226 |
| 6,425,003 B1 * | 7/2002 | Herzog et al. | ................. | 709/223 |
| 6,657,956 B1 * | 12/2003 | Sigaud | ......................... | 370/230 |
| 6,925,465 B2 * | 8/2005 | Lamberton et al. | ............... | 707/9 |
| 7,127,524 B1 * | 10/2006 | Renda et al. | .................... | 709/245 |
| 7,159,183 B1 * | 1/2007 | Kudukoli et al. | ............. | 715/762 |
| 7,506,054 B1 * | 3/2009 | Fuh et al. | ....................... | 709/225 |
| 7,917,941 B2 * | 3/2011 | Wallman | ........................... | 726/4 |
| 2002/0196285 A1 * | 12/2002 | Sojoodi et al. | ................ | 345/771 |
| 2003/0009695 A1 * | 1/2003 | Sato | .............................. | 713/201 |
| 2003/0115447 A1 * | 6/2003 | Pham et al. | .................... | 713/153 |
| 2003/0233580 A1 * | 12/2003 | Keeler et al. | .................. | 713/201 |
| 2005/0066043 A1 * | 3/2005 | Wallman | ....................... | 709/229 |
| 2005/0102662 A1 * | 5/2005 | Samsalovic et al. | .......... | 717/168 |
| 2005/0198270 A1 * | 9/2005 | Rusche et al. | ................. | 709/224 |
| 2006/0114832 A1 * | 6/2006 | Hamilton et al. | ............. | 370/244 |
| 2006/0190990 A1 * | 8/2006 | Gruper et al. | ...................... | 726/3 |
| 2008/0089295 A1 * | 4/2008 | Keeler et al. | .................. | 370/332 |
| 2008/0097858 A1 * | 4/2008 | Vucina et al. | ................... | 705/14 |
| 2009/0265554 A1 * | 10/2009 | Robles et al. | ................. | 713/168 |

* cited by examiner

*Primary Examiner* — David García Cervetti (57) ABSTRACT

A system and method for granting access to a computer network. The method may include, for example, receiving at an access controller a request by a user to access the network using a computing device; providing the user with the option to retrieve a login page if authentication is required prior to network access being granted; using the access controller to verify user credentials provided by the user on the login page, the using the access controller to verify user credentials comprising: comparing a source IP address of a transmission control protocol connection request with a locally defined list of authorized user credentials stored in the access controller; and determining whether a White List associated with the access controller comprises a destination IP address; and granting the user access to the network if the user credentials are verified.

12 Claims, 12 Drawing Sheets

SYSTEM AND METHOD FOR PROVIDING HTML AUTHENTICATION USING AN ACCESS CONTROLLER

This application is related to and claims priority from Provisional Application No. 60/562,397, filed Apr. 14, 2004.

FIELD OF THE INVENTION

The present invention relates generally to communications networks. More particularly, this invention relates to the use of access controllers in communications networks for restricting network access among potential users.

BACKGROUND OF THE INVENTION

Recent improvements in technology have resulted in cheaper and more portable (e.g., smaller and lighter) computing devices, fueling a need for a substantial growth in network communication technology. In particular, the increasing prevalence of laptops and other types of portable computing devices has resulted in an increased demand for network connectivity in a variety of locations apart from a user's home or place of business. For example, the user of a portable computing device may wish to establish a connection to the Internet when within range of a Wireless Internet Service Provider (WISP) or an enterprise network (e.g., in a hotel or airport lounge).

In many circumstances, however, it is not desirable for the operator of a communications network to permit indiscriminate access to the network. For example, in one type of situation, it may be desirable to limit network access to paying subscribers. In another situation, for example, it may be desirable to limit network access to ticketed passengers at an airport. Accordingly, there is a great need for network systems that permits certain authenticated users partial or total access to a network, while partially or completely denying other, non-authenticated users access to the network.

In many network architectures, one or more access controllers or similar components are used for the purpose of providing selective access to a network. For example, in some network architectures, an access controller or gateway device is used to automatically redirect users to a portal page when an attempt to access the network is made. Such access controllers and gateway devices are not adequate, however, because they fail to provide a secure method to inform the user that adequate credentials are required to access a public IP network (such as the Internet). In particular, the use of current access controllers and gateway devices that automatically redirect users to a portal page following network access attempts makes it difficult to detect possible "mad in the middle" attacks, where unwanted devices spoof Internet Protocol (IP) addresses.

In light of the foregoing, it would be desirable to provide an access controller for use in network systems that is capable of presenting a service announcement page to a user in the event that user credentials must be entered prior to network access being granted, such that the security and overall user experience associated with accessing a network from a public location is increased.

BRIEF SUMMARY OF THE INVENTION

The present invention is directed to a system and method for granting access to a computer network. The system may include, for example, a computing device that requests access to the network; and an access controller connected to the computing device by a communication link that receives the request and provides to the computing device a link used for retrieving a login page if it is determined that authentication is required prior to network access being granted, where the access controller grants network access to the computing device after the user credentials entered into the login page have been verified. Moreover, the method may include, for example, receiving at an access controller a request by a user to access the network using a computing device; providing the user with the option to retrieve a login page if authentication is required prior to network access being granted; using the access controller to verify user credentials provided by the user on the login page; and granting the user access to the network if the user credentials are verified. According to the invention, the step of providing the user with the option to retrieve a login page may include displaying to the user a service announcement page, in which case, the login page may be retrieved following the selection of a link on the service announcement page by the user. According to one embodiment of the invention, using the access controller to verify user credentials may include using an AAA server to verify the user credentials. In this case, granting the user access to the network may occur following successful verification of the user credentials against the AAA server. According to another embodiment of the invention, using the access controller to verify user credentials may include using a locally defined list of authorized user credentials stored in the access controller to verify the user credentials. In this case, granting the user access to the network may occur following successful verification of the user credentials against the locally defined list of authorized user credentials.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE INVENTION

In the following description, numerous specific details are set forth regarding the system and method of the present invention and the environment in which the system and method may operate, etc., in order to provide a thorough understanding of the present invention. It will be apparent to one skilled in the art, however, that the present invention may be practiced without such specific details. In other instances, well-known components, structures and techniques have not been shown in detail to avoid unnecessarily obscuring the subject matter of the present invention. It should be understood that these examples are exemplary. It is contemplated that there are other systems and methods that are within the scope of the present invention.

Generally speaking, the present invention is directed to a system and method for granting access to a computer network. The system may include, for example, a computing device that requests access to the network; and an access controller connected to the computing device by a communication link that receives the request and provides to the computing device a link used for retrieving a login page if it is determined that authentication is required prior to network access being granted, where the access controller grants network access to the computing device after the user credentials entered into the login page have been verified. Moreover, the method may include, for example, receiving at an access controller a request by a user to access the network using a computing device; providing the user with the option to retrieve a login page if authentication is required prior to network access being granted; using the access controller to verify user credentials provided by the user on the login page; and granting the user access to the network if the user credentials are verified. According to the invention, the step of providing the user with the option to retrieve a login page may include displaying to the user a service announcement page, in which case, the login page may be retrieved following the selection of a link on the service announcement page by the user. According to one embodiment of the invention, using the access controller to verify user credentials may include using an AAA server to verify the user credentials. In this case, granting the user access to the network may occur following successful verification of the user credentials against the AAA server. According to another embodiment of the invention, using the access controller to verify user credentials may include using a locally defined list of authorized user credentials stored in the access controller to verify the user credentials. In this case, granting the user access to the network may occur following successful verification of the user credentials against the locally defined list of authorized user credentials.

Figure 1:
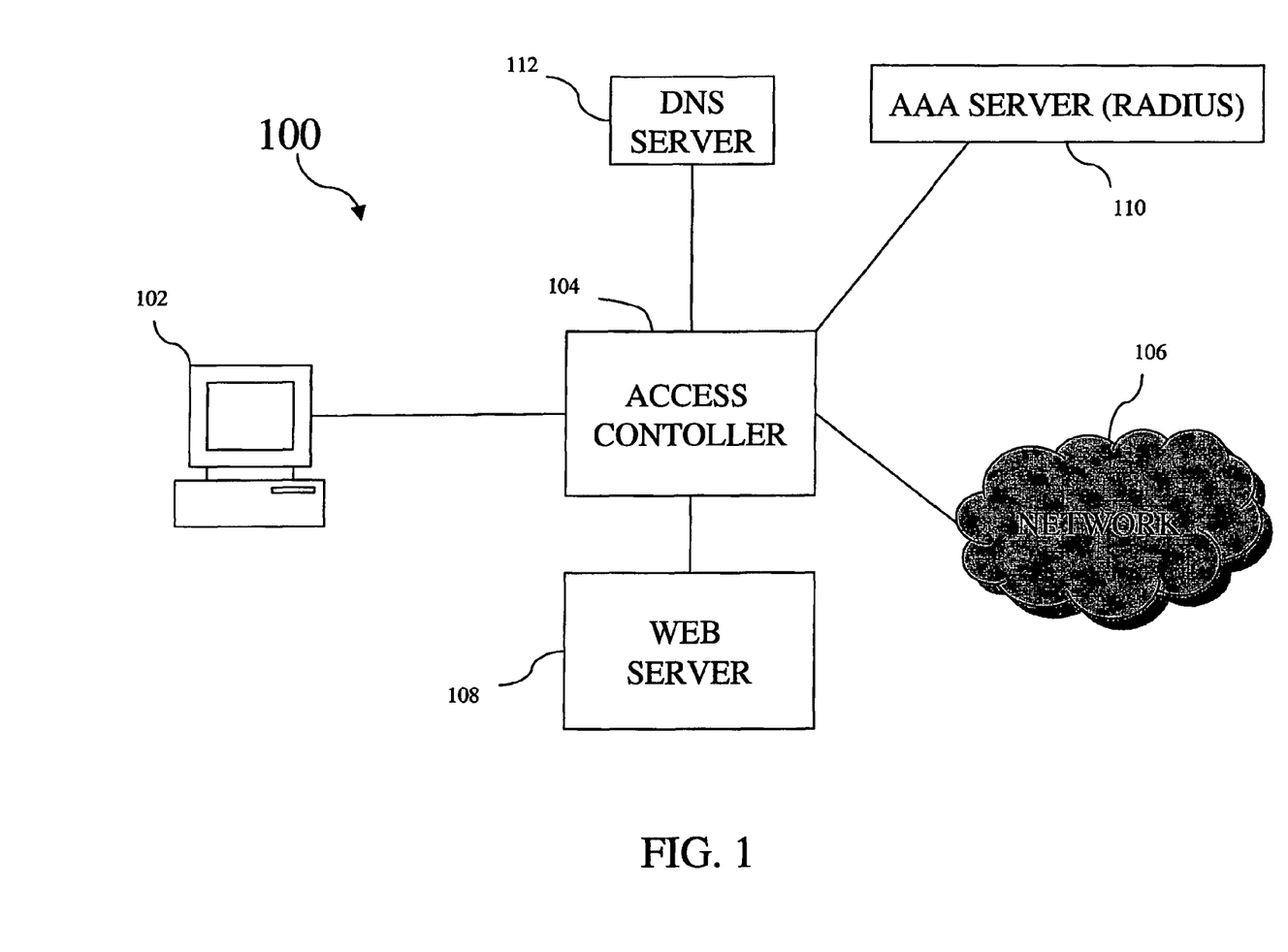
FIG. 1 illustrates a simplified block diagram of an exemplary network system using an access controller according to the principles of the present invention.

FIG. 1 illustrates a simplified block diagram of an exemplary network system 100 using an access controller according to the principles of the present invention. As shown in FIG. 1, network system 100 includes a portable computing device 102 that is connected by a communication link (physical or wireless) to an access controller 104. It will be understood that, according to the principles of the present invention, portable computing device 102 may be any device through which a user desires to access network 106 (e.g., the Internet). For example, computing device 102 may be a laptop or other personal computer, mobile (cellular) telephone, personal digital assistant (PDA), fax machine, printer, or any other type of portable computing device that is capable of sending and/or receiving data using a standard browser program (e.g., Internet Explorer® or Netscape Navigator®) or a similar program.

As shown in FIG. 1, network system 100 also includes a Web server 108, which may be an Internet Service Provider (ISP) Web server, for example. In addition, network system 100 includes an Authentication, Authorization and Accounting (AAA) Server, or RADIUS 110, which as explained in greater detail below, is used to determine if a user attempting to access network 106 should be granted access. Finally, as shown in FIG. 1, network system 100 includes a domain name system (DNS) server 112, which is used to translate domain names entered by a user as part of a Uniform Resource Locator (URL) into the corresponding IP address. It should be understood that, while a single DNS Server 112 is shown in FIG. 1, the invention is not limited in this manner. For example, in a situation where DNS server 112 does not know how to translate a particular domain name, another DNS server (not shown) may be referenced, and so on, until the correct IP address is returned.

Figure 2:
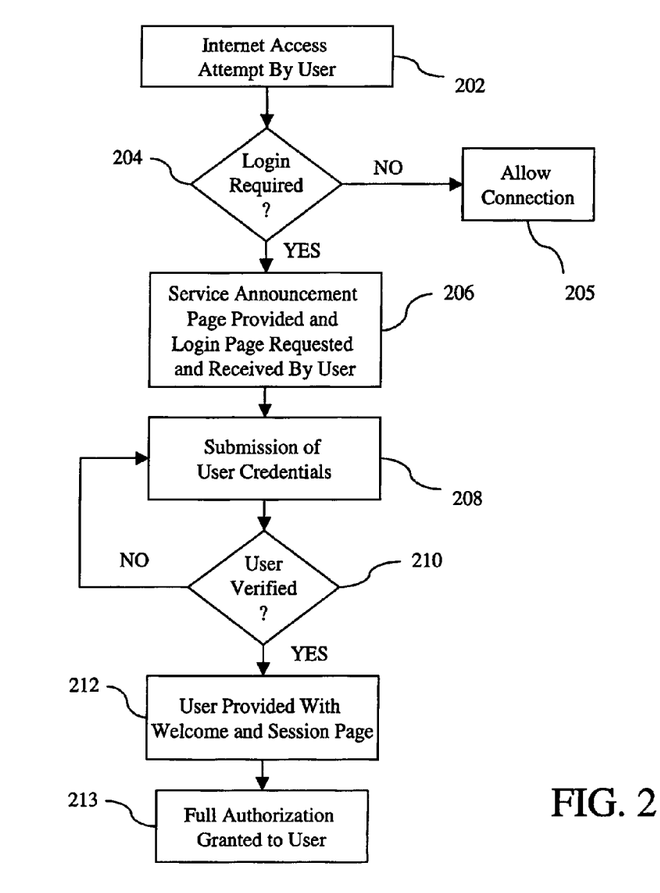
FIG. 2 is a flow chart illustrating the exemplary steps performed by components depicted in FIG. 1 in granting network access to a user according to the principles of the present invention.

FIG. 2 is a flow chart illustrating the exemplary steps performed by components of network system 100 described above in granting a user access to network 106 according to the principles of the present invention. In particular, the flowchart of FIG. 2 provides an overview of the key steps, each explained in greater detail below with respect to FIGS. 3-8, that are involved in granting network access to the user after the user has requested network traffic using a browser or other program in computing device 102.

In the first step (step 202), the user attempts to access network 106, which as explained above, may be the Internet. For example, the user may be attempting to access a Web site on the Internet via a browser program. It will be understood, however, that the invention is not limited by the particular manner in which the user attempts to access network 106, and that the use of a browser in describing the principles of the present invention is for illustrative purposes only. Step 202 is illustrated in greater detail by the flowchart of FIG. 3, which is explained below.

In step 204, which is explained in greater detail with reference to the flowchart of FIG. 4, access controller 104 determines whether the user must go through a login process before access to network 106 is granted. This determination is made prior to the requested network access (step 202) being granted to computing device 102, or the browser thereof. If it is determined in step 204 that the user does not need to go through a login process, the user attempted connection is permitted to go through by access controller 104 in step 205. For example, if it is determined that the user has previously been authenticated (and remains logged in), for example, then the user's attempt to access a Web site will be successful and a connection with the Web site will be established such that data may be exchanged back and forth. A similar result may arise if it is determined that the user is attempting to access a Web site that is among those specified in the Web address White List (which collectively make up a Walled Garden, or the portion of the Web that is available to users even if they have not been authenticated). The Web sites specified in the White List may include, for example, an intranet Web site that provides a user with information relating to gaining full access to network 106. It will be understood that Web sites can always be added or removed from the White List as desired, for example, by a network administrator with authority to alter the White List associated with access controller 104.

Figure 9:
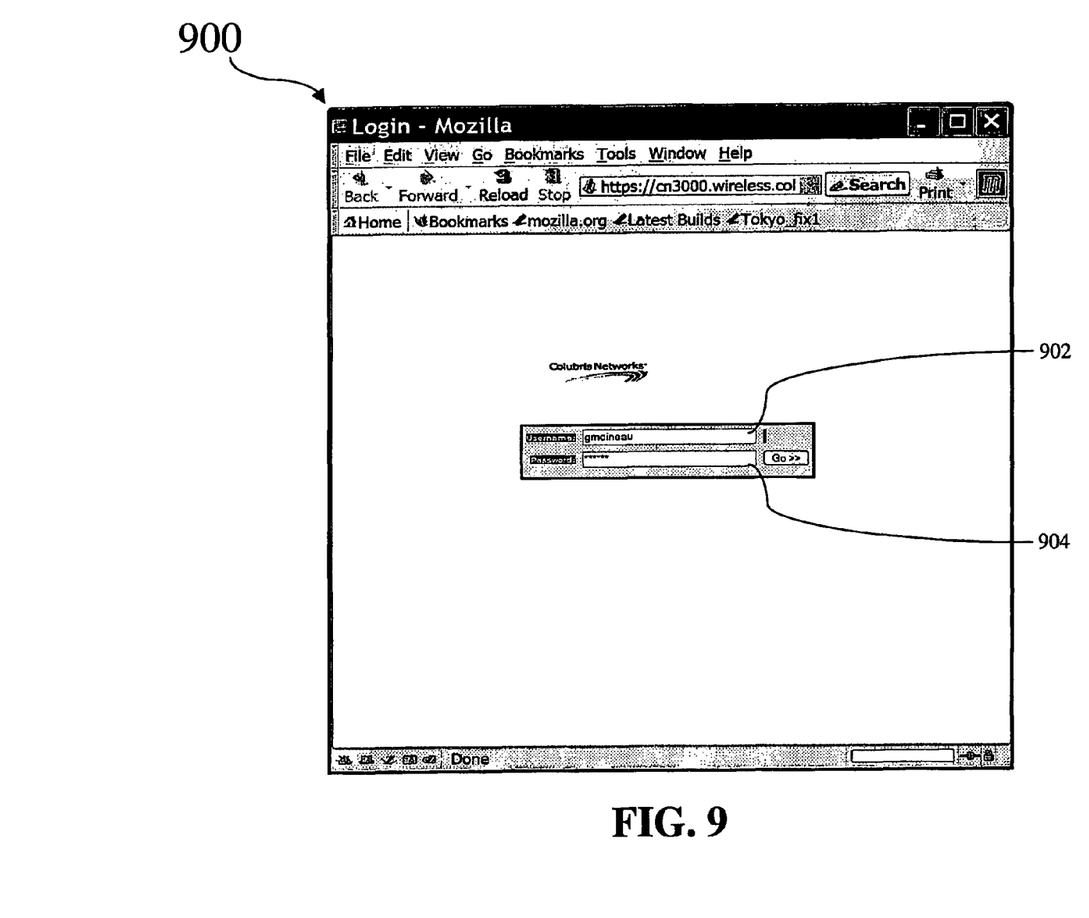
FIG. 9 illustrates an exemplary embodiment of a login page in accordance with the principles of the present invention.
Figure 11:
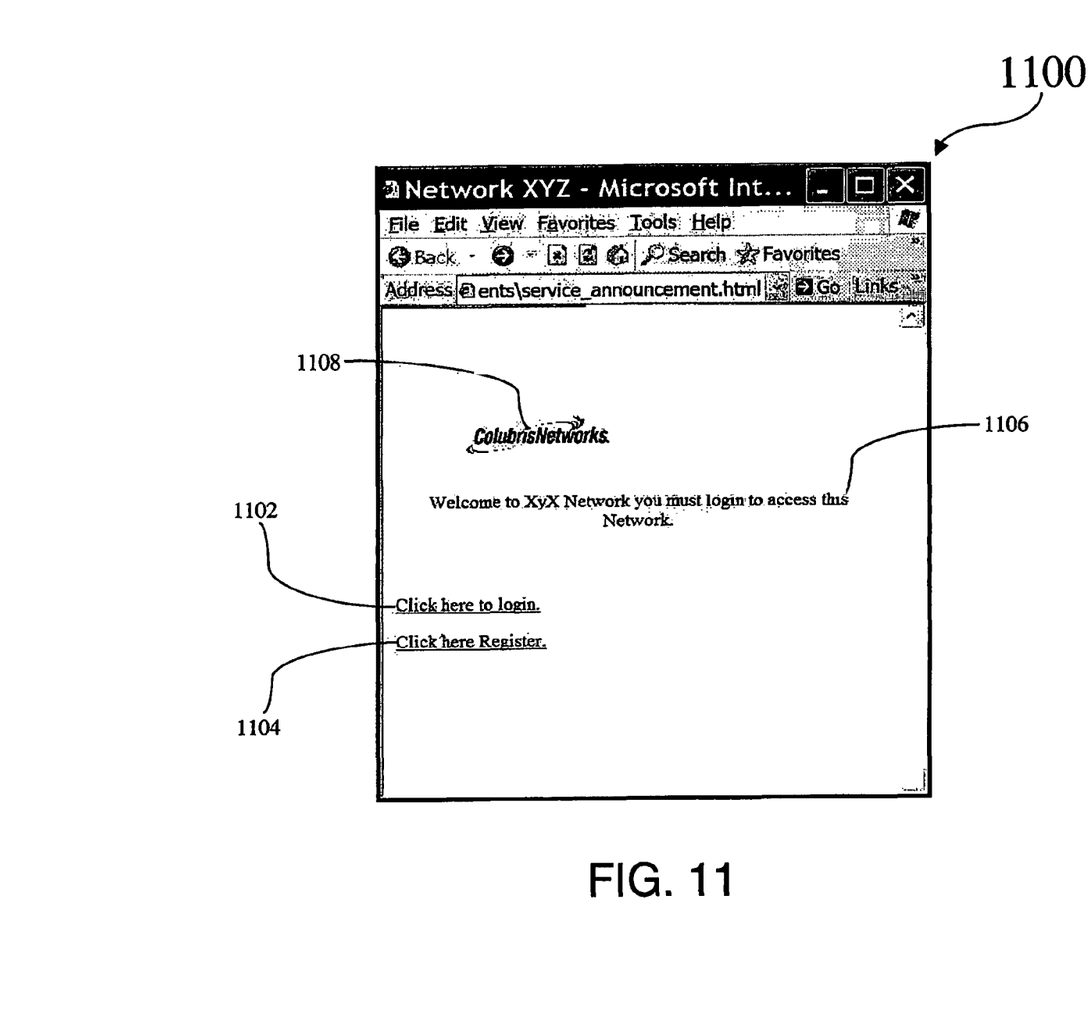
FIG. 11 illustrates an exemplary embodiment of a service announcement page in accordance with the principles of the present invention.

When a user is not yet authenticated, and is attempting to access a Web site not specified in the White List (which will be assumed herein unless specified otherwise), step 204 dictates that the network connection requested by the user be at least temporarily denied, and the process of granting network access continues onto step 206. In step 206, which is explained in greater detail with reference to FIG. 5, the user's Web browser is provided with a service announcement page (which can optionally be protected by a valid Secure Socket Layer (SSL) certificate), and a login page is requested by the user (e.g., by clicking on a link) and is shortly thereafter provided to the user's browser. For example, the login page may contain one or more graphic elements, along with one or more fields for inputting user credentials (e.g., a username and password). Moreover, according to the principles of the present invention, the login page may reside within access controller 104, or on Web server 108, for example. It will be understood that the invention is not limited by the location of the login page retrieved by the user. Illustrative examples of a service announcement page and a login page according to the principles of the present invention are shown in FIGS. 11 and 9, respectively, and are described below.

Once provided with the login page during step 206, the user is given the option in step 208 (which is described in greater detail below with reference to FIG. 6) to enter his or her user credentials (e.g., an ID and Password), which will ultimately be used by access controller 104, Web server 108 and AAA server 110 in the user authentication process. It will be understood that, depending on the login method associated with system 100, the details of the data exchange will vary slightly. For example, an internal login page method, an external login page method, or a method using NOC Authentication, each of which are supported by the access controller 104, may be used according to the principles of the present invention. Each of these methods are explained immediately below.

Using the internal login page method, for example, a default login page may be created as part of the default factory settings of access controller 104. Additionally, for example, the default login page may be replaced with a login page that is downloaded into an embedded Web server (not shown) of access controller 104 and saved into non-volatile storage such that a restart of access controller 104 would not erase the stored login page. In this case, the login page can be customized, for example, to include one or more logos or advertisements. While this method is simple and easy to implement, in various embodiments of the invention, the size of the login page (including the one or more logos) may sometimes be limited by the available storage of the device acting as the Web server. When this is the case, it is possible to rely on an external standard Web server that does not impose such restrictions on the size of the login page.

The external login page method is similar to the internal login page method, except that the login page resides on a generic external Web server (e.g., Web server 108), and not within access controller 104. In this case, there is generally no limitation with regards to the number of graphical objects, or the total size, associated with the login page, and the URL of the remote login page is stored by access controller 104. This method is particularly beneficial when the ISP wants to provide a consistent experience ("look and feel") to its users at any of the locations where the network service is available. In particular, it is possible for the ISP to customize the content of an external login page by using information about the location of the login page and other relevant information. Although an external Web server is used with the external login page method, in preferred embodiments of the present invention, the user credentials are nonetheless captured directly by access controller 104.

The final method, using NOC authentication, also relies on an external login page. However, the interactions between the user's WEB browser, access controller 104 and the external Web server are different because the user credentials sent with the HTML POST message by the user's browser are captured by the external Web server and provided to the access controller 104 via a SSL interface. One advantage obtained by using this approach is that the number of digital certificates signed by a trusted Certificate Authority (e.g., VeriSign®) is limited.

Once the user has submitted credentials in step 208, and once access controller 104 has received them, access controller 104 attempts to validate these credentials against AAA server 110 (step 210). In particular, as explained in greater detail below with reference to FIG. 7, AAA server 110 is responsible for replying to access controller 104 with a positive or negative answer, depending on whether the user has been authenticated or not. Assuming the user is not authenticated in step 210, step 208 may be repeated as illustrated in FIG. 2. It will be understood, however, that the invention is not limited in this manner: For example, when step 210 does not result in successful authentication, any of the preceding steps may then be repeated (with the exception of step 205, given that the user should not be given access to network 106 at this time). Alternatively, for example, the step that follows a failed authentication at step 210 may depend on the number of previous failed attempts at authentication.

Figure 10:
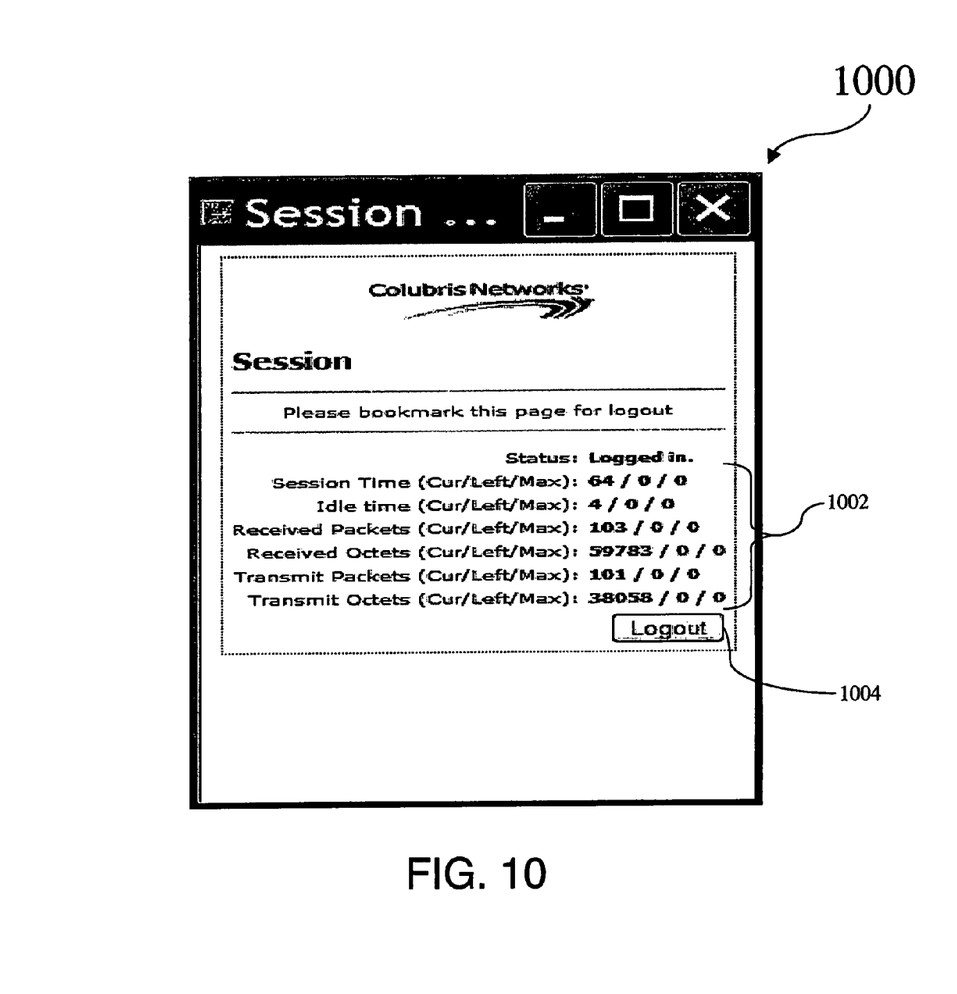
FIG. 10 illustrates an exemplary embodiment of a session page in accordance with the principles of the present invention.

Assuming that the authentication process is successful at step 210, the login process is completed and the user is notified of the successful authentication with an optional welcome page at step 212. The welcome page may notify the user that network access has been granted and may include, for example, customer information based on the name of the user, the location where the network service is being used, and/or the URL that was initially requested triggering the user authentication process. Moreover, the welcome page may include a link to the page that was originally requested (e.g., via a placeholder on the URL pointing to the welcome page). If a custom URL is not defined by access controller 104, for example, then the originally requested page is automatically accessed by the user's browser. In addition to a welcome page, a session page for providing session information may also be provided to the user following successful authentication at step 210. An exemplary session page is shown in FIG. 10 and described below.

Following successful authentication at step 210, moreover, the user is permitted full access to the network at step 213 (according to the permissions granted to an authorized user by the network administrator, for example), and all IP traffic goes unmodified (or modified according to the permission granted) across access controller 104 while the user remains logged in. In other words, while the user remains logged in (authenticated), a determination will be made at step 204 for each subsequent network access attempt that login is not required, and that connection to the Internet, for example, should be allowed (subject to the permissions granted to the user).

Figure 3:
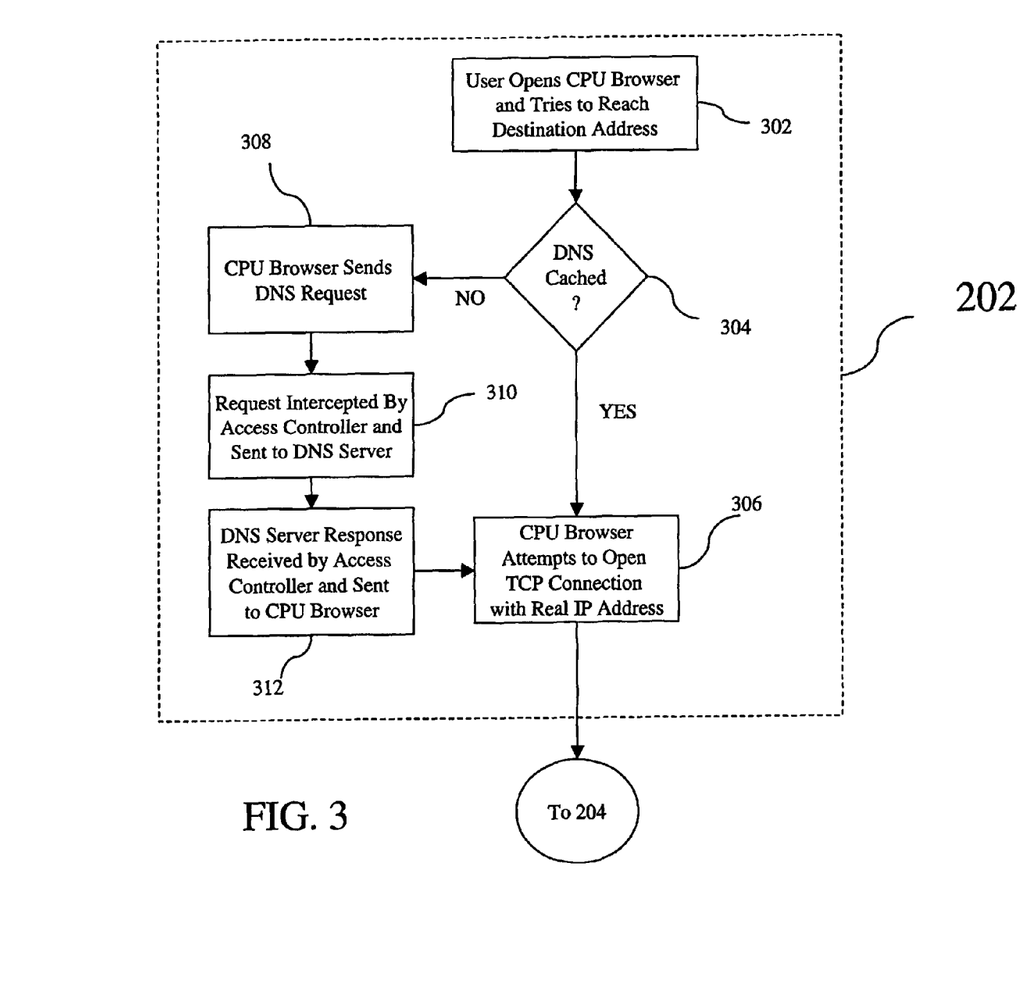
FIG. 3 is a more detailed flow chart of a step depicted in FIG. 2 according to the principles of the present invention.

Referring now to FIG. 3, a user's attempt to access the network (step 202, FIG. 2) may include the following steps. At step 302, the user opens a Web browser on computing device 102 and attempts to access a destination address, www.google.com for example. As explained below, according to step 304, what step follows next depends on whether the IP address of the destination address is known to the browser.

In particular, if the user's browser has previously cached the IP address of the URL that the user is trying to access (and the IP address has not been purged from the cache), a DNS request is not sent and the browser attempts to open a TCP connection directly with the IP address (e.g., 216.239.39.147) for the user entered URL of www.google.com (step 306). Similarly, when the user explicitly enters the IP address of www.google.com (instead of entering the URL), the browser attempts to open a TCP connection directly with the entered IP address. In both of these scenarios, the user's browser instead opens a TCP connection with access controller 104, which uses the IP address of www.google.com as the source IP address for all data sent back to the user's browser. Once the user has been authenticated, however, the user's browser is able to establish a TCP connection with www.google.com and data may thereafter be exchanged between the two.

When the user's Web browser does not know the IP address for the URL entered by the user, it needs to issue a DNS request to resolve the destination URL to an IP address. According to step 308, the browser sends a DNS request to find out the correct IP address to use in order to reach the destination address, which in this case is www.google.com. At step 310, access controller 104 intercepts this DNS request sent by the browser, and sends the request to DNS Server 112 to obtain the actual IP address for www.google.com. At step 312, meanwhile, access controller 104 receives the DNS reply from the DNS server 112, and provides this reply to the browser. Once the DNS reply (e.g., the IP address of the originally entered URL of www.google.com) is received from access controller 104, the browser attempts to open a TCP connection directly with the IP address (as explained above with respect to step 306).

Figure 4:
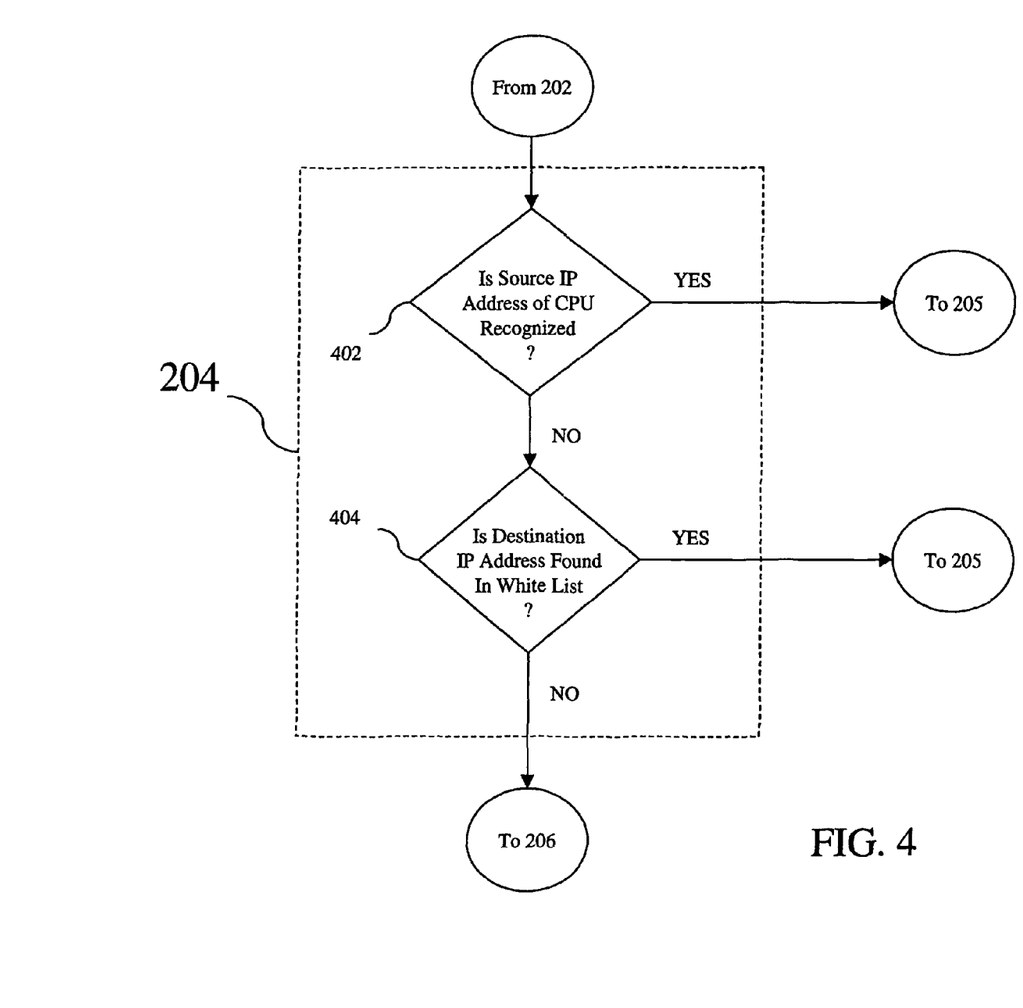
FIG. 4 is a more detailed flow chart of a step depicted in FIG. 2 according to the principles of the present invention.

Referring now to FIG. 4, determining whether the user must login to obtain network access (step 204, FIG. 2) preferably includes the following steps. At step 402, access controller 104 compares the source IP address of the TCP connection request against its list of logged in users. Assuming the source IP address is found in this list, access controller 104 allows the user's originally requested TCP connection (from step 306 of FIG. 3) to go through, and a connection to the requested URL is established such that data may be exchanged between the user's browser and www.google.com.

On the other hand, if the source IP address of the TCP connection request is not found in the list of authorized users, at step 404, access controller 104 determines whether the destination IP address (in this case, the IP address of www.google.com) is found in the White List associated with access controller 104. If the IP address is found in the White List, the access controller 104 permits the originally requested TCP connection to go through.

Although shown as consecutive steps 402 and 404 in FIG. 4, it will be understood that these steps may be interchanged without departing from the spirit of the present invention. Namely, in other embodiments of the present invention, it is contemplated that access controller 104 first determines whether the destination IP address is found in the White List. In this case, only after access controller 104 determines that the destination IP address is not found in the White List will access controller 104 determine whether the source IP address of the TCP connection request is found in the list of logged in users.

Figure 5:
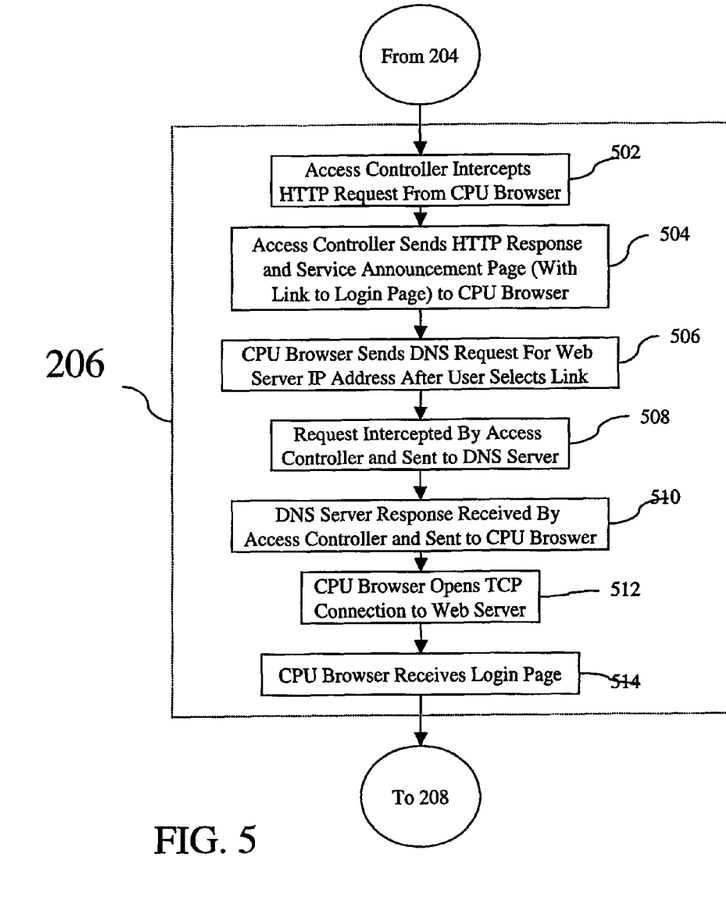
FIG. 5 is a more detailed flow chart of a step depicted in FIG. 2 according to the principles of the present invention.

Referring now to FIG. 5, assuming that the user requesting access to network 106 is not logged in (and the source IF address of the TCP connection request is not in the list of logged in users maintained by access controller 104), and assuming that the destination IP address is not found in the White List associated with access controller 104, the exemplary steps involved in providing the user with a service announcement page (e.g., the page shown in FIG. 11) and an opportunity to retrieve the login page (step 206, FIG. 2) are illustrated in FIG. 5. In step 502, access controller 104 pretends to be the IP address of www.google.com and intercepts the Hypertext Transfer Protocol (HTTP) request from the user's browser. Preferably, step 502 also includes the user's originally requested URL (in this case, www.google.com) being cached by access controller 104 such that it may be used after the user has successfully logged in (e.g., by the welcome page as described above).

In step 504, access controller 104 sends an HTTP response to the user's browser, using the IP address of www.google.com as the source IP address. This response is returned with an error 403 "Forbidden" (the protocol for HTTP requests and responses are described in detail in "Hypertext Transfer Protocol—HTTP/1.1," Network Working Group Request for Comments (RFC): 2616, June 1999, which is incorporated herein by reference in its entirety). Also sent to the user's browser is the service announcement page that provides the user with a link to the ISP's local or remote login page. Optionally, a message such as "You need to login to access the network, Click here to login" is displayed to the user on the service announcement page.

In step 506, the user clicks the link to login provided on the service announcement page, and the user's browser sends a DNS request to obtain the IP address needed to reach the Web server 108. This request is intercepted by access controller 104, which thereafter sends a distinct DNS request to DNS server 112 (step 508). In step 510, access controller 104 receives the DNS reply from DNS server 112 and proceeds to send this received DNS reply to the user's browser. Once the DNS reply is received by the user's browser, a TCP connection with Web server 108 is opened, and a Hypertext Transfer Protocol over Secure Socket Layer (HTTPS) Get request, for example, is sent to Web server 108 to get the login page (step 512). Persons skilled in the art will appreciate that, while HTTPS is preferably used, the invention is not limited in this manner (e.g., an HTTP Get request may be sent instead). In response to the Get request sent by the user's browser, according to step 514, the browser receives the login page from the Web server 108.

Figure 6:
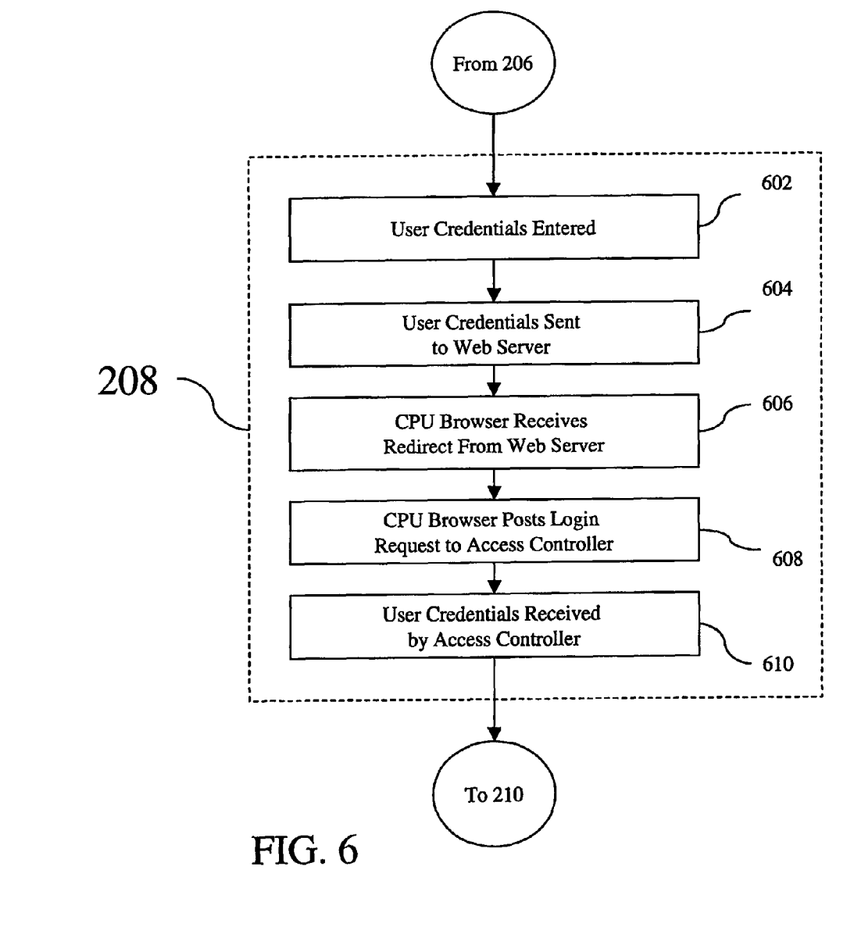
FIG. 6 is a more detailed flow chart of a step depicted in FIG. 2 according to the principles of the present invention.

Referring now to FIG. 6, the submission of user credentials for the purpose of authenticating the user (step 208, FIG. 2) preferably includes the following steps. In step 602, the user enters his or her credentials (e.g., a username and password). For example, the username may take the form of username@isp.net, where "username" is the user's unique identifier established with the ISP, and "isp.net" is the host name, or domain name of the ISP (which, as persons skilled in the art will appreciate, may or may not be a wireless ISP). Afterwards, referring to step 604, the user elects to submit the entered credentials (e.g., by clicking a login button), and the user's browser sends an HTTPS POST to Web server 108 to submit the user's entered credentials (although, as explained above, the invention is not limited to the use of HTTPS). In step 606, the user's browser receives a redirect from Web server 108 processing the login page. Thereafter, in step 608, the user's browser posts a login request to the login URL of access controller 104 to add the user's IP address to the list of authenticated users, including the username and password to unlock the firewall for this IP address. In step 610, access controller 104 receives the submitted user credentials.

It will be appreciated by persons skilled in the art that, although a particular method using an external login page is described above in connection with FIGS. 5-6, the invention is not limited in this manner. For example, an internal login page (residing on a Web server embedded in access controller 104) can be used without departing from the scope of the present invention. In this case, as explained above, the login page may reside in non-volatile memory of access controller 104, for example. Additionally, for example, an external login page may be used as described above, with the use of NOC authentication. In this case, the user credentials are captured by the external Web server being used, and provided to access controller 104 via an SSL interface (instead of being sent directly to access controller 104).

Figure 7:
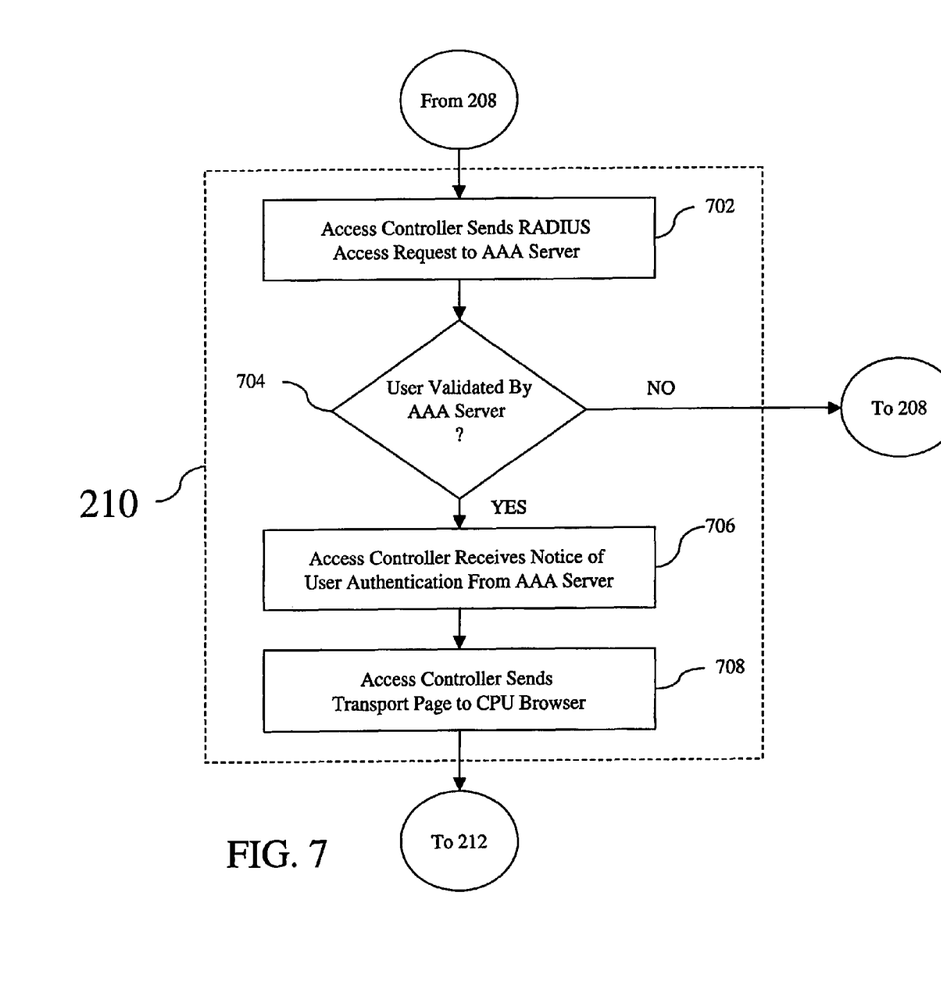
FIG. 7 is a more detailed flow chart of a step depicted in FIG. 2 according to the principles of the present invention.

Referring now to FIG. 7, authentication of the user based on the submitted user credentials (step 210, FIG. 2) preferably includes the following steps. In step 702, access controller 104 sends a RADIUS access request to AAA server 110. In step 704, AAA server 110 determines if the user's credentials sent by access controller 104 are valid. If the user's credentials are found to be invalid, as explained above with regard to the flowchart of FIG. 2, access controller 104 may provide the user with another opportunity to enter valid credentials (step 602, FIG. 6). Additionally, for example, a login error page (not shown) can be provided to the user's browser if the user's credentials are not validated. For example, such a login error page can be provided after the first failed login attempt, after the third failed login attempt, etc., and preferably displays to the user the reason for the failed authentication.

Meanwhile, if AAA server 110 determines the user's credentials sent by access controller 104 to be valid, according to step 706, AAA server 110 replies to access controller 104 with an indication (Access Accept) that the user's credentials have been verified. At this time, the user has been authenticated, and in step 708, access controller 104 sends a transport page (used to spawn welcome and session pages which are explained below) to the user's browser in reply to the sent HTTPS POST described above. Additionally, in certain preferred embodiments according to the principles of the present invention, a fail page may be provided to the user's browser if access controller 104 cannot contact AAA server 110 (and thus cannot validate the user's credentials). Similarly, a fail page may be provided to the user's browser if access controller 104 is not able to authenticate itself to AAA server 110.

Although verification of the user's credentials in the manner described above is accomplished using AAA server 110, the invention is not limited in this manner. For example, it will be understood that, in alternate embodiments of the present invention, the user's credentials may be verified against a locally defined list of authorized user credentials stored internally to access controller 104. In this case, once the user's credentials are captured by access controller 104, an internal verification process may be used by access controller 104 in determining whether the user should be authenticated and granted network access, where the captured user credentials are compared with the internally stored user credentials.

Figure 8:
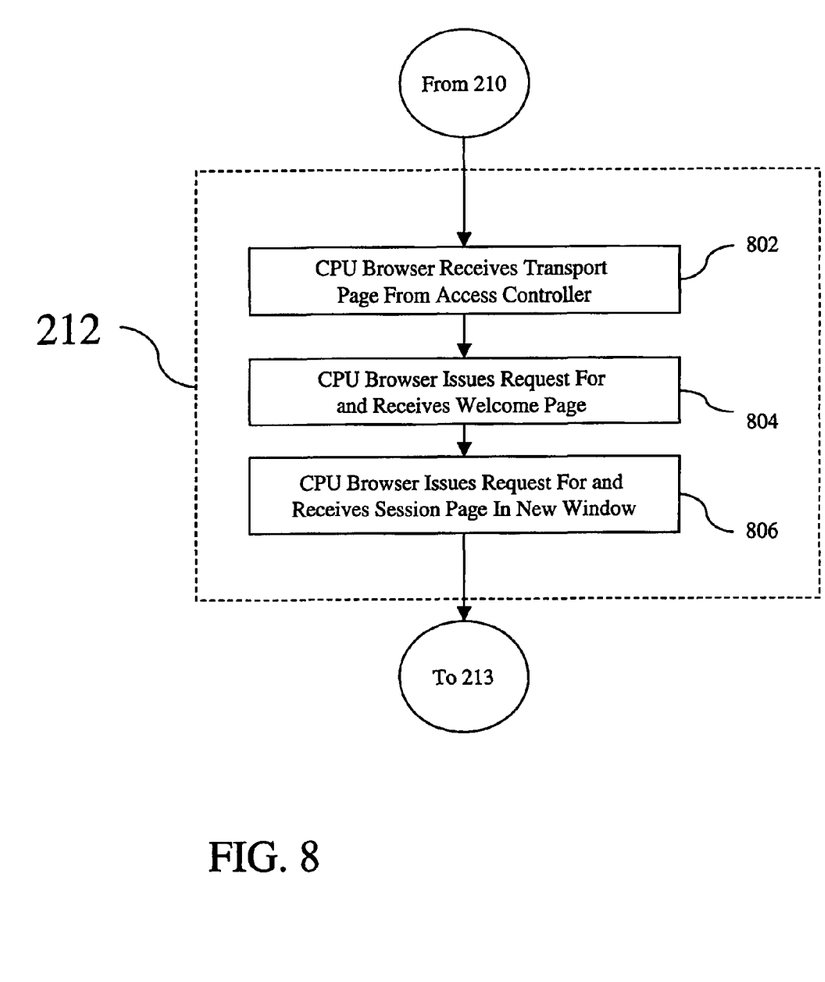
FIG. 8 is a more detailed flow chart of a step depicted in FIG. 2 according to the principles of the present invention.

Referring now to FIG. 8, the steps involved after the user has been authenticated (step 212, FIG. 2) preferably include the following. In step 802, the user's browser receives the transport page sent by access controller 104. At this time, according to step 804, the user's browser issues an HTTP Get request to obtain the welcome page mentioned above, and the welcome page is received by the browser. In step 806, meanwhile, the browser may also issue an HTTP Get request to access controller 104 in order to obtain a session page, such as the one described below in connection with FIG. 10. It should be understood, however, that steps 804 and 806 are interchangeable according to the principles of the present invention. Moreover, it should also be understood that HTML pages described herein, such as the welcome and session pages of step 804 and 806, respectively, may be internal HTML pages residing on access controller 104, or external HTML pages stored on a remote Web server, where the URL's are retrieved by access controller 104 when access controller 104 either authenticates itself to AAA Server 110 or when access controller 104 authenticates a customer using AAA Server 110, for example.

Once a user has been authenticated, the user's browser is able to send and receive data to and from network 106 (e.g., the Internet). In particular, following authentication, the user is allowed to access network 106 until the moment that the session is terminated either by the user or by access controller 104 (e.g., based on one or more specific conditions being met, such as session time expiration or a volume quota being reached). Moreover, when one or more accounting features are turned ON, which may be the default option, access controller 104 may capture usage information relating to the overall duration of the user's session, the volume of data sent, the volume of data received, and/or any other relevant information. For example, the information presented to the user in session page 1000 of FIG. 10 described below may be captured by access controller 104, sent to AAA Server 110 for archiving (preferably as regular intervals), and later used for accounting purposes. In this case, the resulting billing process from the user's access to the network preferably uses the accounting records archived in AAA Server 110.

An exemplary embodiment of a login page 900 according to the principles of the present invention is illustrated in FIG. 9. As shown in FIG. 9, Welcome Page 900 may include a form 902 for entering a username, and a form 904 for entering a password, for example. The invention is not limited by the particular format or content of Welcome Page 900.

Meanwhile, an exemplary embodiment of a session page 1000 according to the principles of the present invention is illustrated in FIG. 10. As shown in FIG. 10, session page 1000 may display usage statistics 1002 for the user's current session. For example, usage statistics 1002 may include information relating to the user's session time, idle time, received packets and octets and transmitted packets and octets. Moreover, in certain preferred embodiments of the present invention, session page 1000 is refreshed periodically to update the information provided in usage statistics 1002. It should be noted that, based on the setup by the ISP, access by a logged in user to a Web site that is found on the White List may or may not be included in determining usage statistics 1002. For example, the time associated with accessing a Web site found in the White List may optionally be excluded when determining the session time for a user. Additionally, depending on the setup by the ISP, for example, remaining session time (rather than current session time) may be displayed as part of usage statistics 1002. Of course, what is displayed in usage statistics 1002 is customizable, and will likely depend on the subscription type of an individual user.

As also shown in FIG. 10, session page 1000 may include a logout button 1004, which the user clicks to terminate the session. According to various embodiments of the invention, a goodbye page (not shown) is displayed to the user via the user's browser to acknowledge a user logout. It will be understood that session page 1000 described above and shown in FIG. 10 is for illustrative purposes only, and that session pages may include different features (as customized by the ISP using access controller 104) without departing from the principles of the present invention.

FIG. 11 illustrates an exemplary embodiment of a service announcement page 1100 according to the principles of the present invention. In particular, service announcement page 1100 includes a link 1102 for users to click to retrieve the login page in the manner described above. Although a particular type of link 1102 is shown in FIG. 11, it will be understood that the invention is not limited in this manner. For example, in other embodiments of the present invention, a drop down menu (not shown) can be used, from which the user makes a selection that causes the login page to be retrieved.

In addition to link 1102, service announcement page 1100 also includes a registration link 1104, text 1106 and logo 1108, each of which are optional. Registration link 1104 may be used by a user, for example, to create an account with the ISP and to obtain valid user credentials. Meanwhile, text 1106 preferably informs the user that login must be completed before network access will be granted, and logo 1108 may be any suitable logo (e.g., a default logo as shown in FIG. 11 or a logo selected by the ISP using access controller 104). It will be understood that additional features may be present on service announcement page 1100 without departing from the scope of the present invention. For example, when more than one ISP (e.g., two or more WISPs) is available to a user, service announcement page 1100 may provide the user with the ability to select from one of the available ISPs to access network 106. In this case, it is contemplated that the selection of link 1102 by the user will retrieve the login page associated with the selected ISP, in the manner described above.

Figure 12:
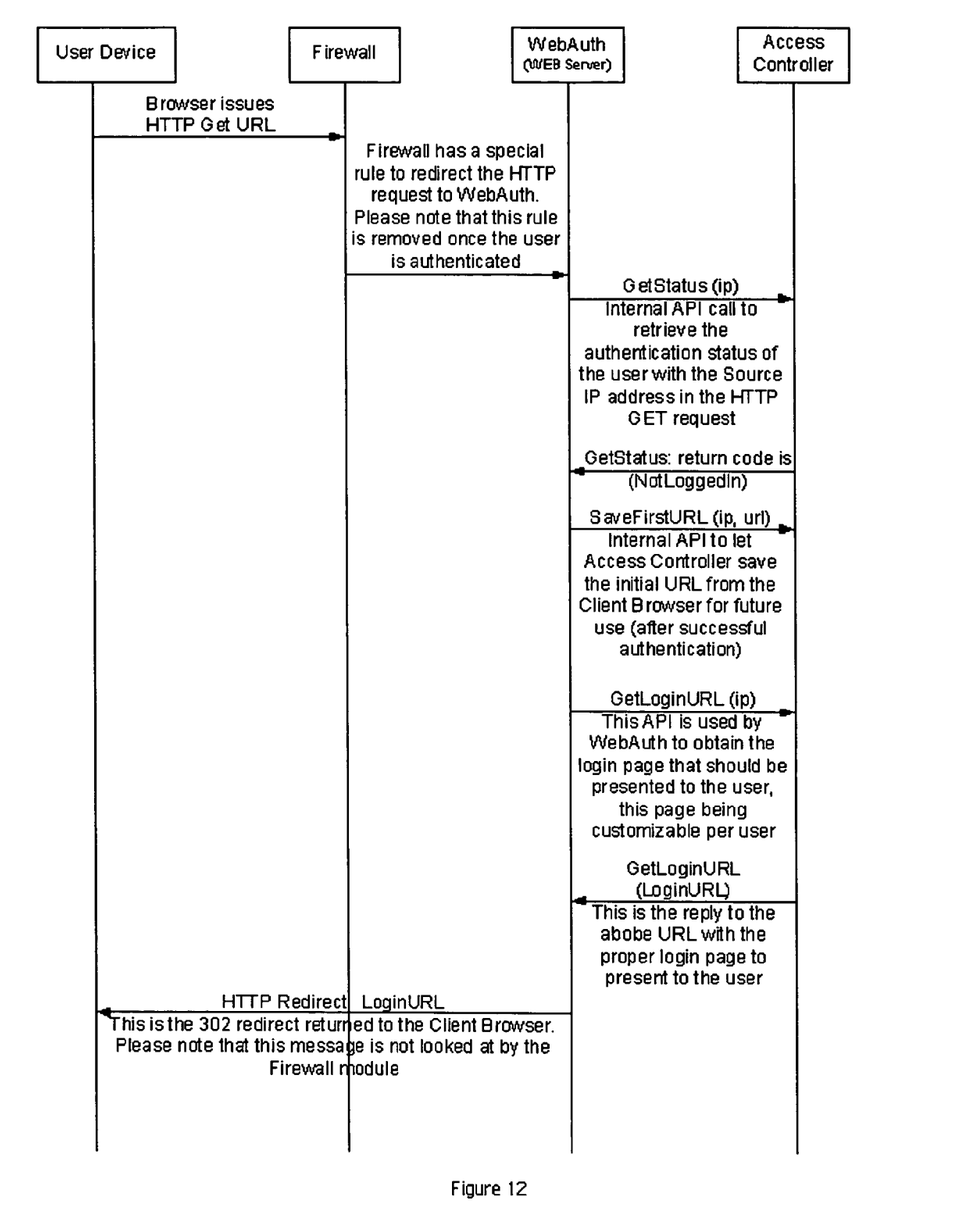
FIG. 12 is a process flow diagram illustrating the various messages that are passed between components in a given implementation wherein a web server is located within an access device.

FIG. 12 illustrates representative message flow when an internal Web server is used within an access device. In this example, the Web server is identified by a process called WebAuth. The access device also includes a Firewall process, and a separate Access Controller process. The internal communications between the Web server process and the Access Controller process are illustrated.

Although the invention has been described and illustrated in the foregoing exemplary embodiments, it is understood that the present disclosure has been made only by way of example, and that numerous changes in the details of implementation of the invention may be made without departing from the spirit and scope of the invention.

The invention claimed is:

1. A method for granting access to a computer network, comprising:
receiving at an access controller a request by a user to access the network using a computing device, the request by the user including a transmission control protocol (TCP) connection request having a source IP address and a destination IP address;
determining by the access controller whether the user must login to access the network, including
comparing the source IP address with a list of logged in users stored in the access controller, wherein if the source IP address is included on the list of logged in users the user is granted access without logging in, and if the source IP address is not included on the list of logged in users, then
determining whether the destination IP address is included in a White List associated with the access controller, wherein if the destination IP address is included in the white list the user is granted access without logging in, and if the destination IP address is not included in the white list, then;
the access controller determines the user must login to access the network and provides the user with an option to retrieve a login page;
using the access controller to verify user credentials provided by the user on the login page; and
granting the user access to the network if the user credentials are verified.

2. The method of claim 1, wherein the providing the user with the option to retrieve a login page comprises displaying to the user a Service Announcement Page.

3. The method of claim 2, wherein the login page is retrieved following the selection of a link on the Service Announcement Page by the user.

4. The method of claim 1, wherein the using the access controller to verify user credentials comprises using an AAA server to verify the user credentials.

5. The method of claim 4, wherein the granting the user access to the network occurs following successful verification of the user credentials against the AAA server.

6. The method of claim 1, wherein the granting the user access to the network occurs following successful verification of the user credentials against the locally defined list of authorized user credentials.

7. The method of claim 1, wherein the White List includes web sites that are available to the user if the user is not authenticated.

8. A system for providing network access to a user comprising:
a computing device that requests access to the network, the request including a transmission control protocol (TCP) connection request having a source IP address and a destination IP address; and
an access controller connected to the computing device by a communication link that receives the request and provides to the computing device a link used for retrieving a login page if it is determined that authentication is required prior to network access being granted based on comparing the source IP address with a list of logged in users stored in the access controller, wherein if the source IP address is included on the list of logged in users the user is granted access without logging in and if the source IP address is not included on the list of logged in users, then
determining whether the destination IP address is included in a White List associated with the access controller, wherein if the destination IP address is included in the white list the user is granted access without logging in, and if the destination IP address is not included in the white list, then the access controller grants network access to the computing device after the user credentials entered into the login page have been verified.

9. The system of claim 8 further comprising an AAA server, wherein the granting of network access to the computing device occurs following successful verification of the user credentials against the AAA server.

10. The method of claim 8, wherein the determining whether the destination IP address is included in the White List associated with the access controller is omitted if the source IP address is included in the list of logged in users stored in the access controller.

11. The system of claim 8, wherein the determining whether the destination IP address is included in the White List associated with the access controller is omitted if the source IP address is included in the list of logged in users stored in the access controller.

12. The system of claim 8, wherein the White List includes web sites that are available to the user if the user is not authenticated.

* * * * *

UNITED STATES PATENT AND TRADEMARK OFFICE
CERTIFICATE OF CORRECTION

| | | |
|---|---|---|
| PATENT NO. | : 8,046,578 B1 | Page 1 of 1 |
| APPLICATION NO. | : 11/105652 | |
| DATED | : October 25, 2011 | |
| INVENTOR(S) | : Pierre Trudeau et al. | |

It is certified that error appears in the above-identified patent and that said Letters Patent is hereby corrected as shown below:

On the Title page, in Item (73), Assignee, in column 1, line 2, delete "Comopany," and insert -- Company, --, therefor.

In column 12, line 33, in Claim 8, delete "on" and insert -- on: --, therefor.

Signed and Sealed this
First Day of January, 2013

David J. Kappos
*Director of the United States Patent and Trademark Office*